3,341,595
PREPARATION OF 3-CHLORO-4-TOLUIDINE
Arthur Albert Doering, Bound Brook, N.J., assignor to American Cyanamid Company, Stamford, Conn., a corporation of Maine
No Drawing. Filed Oct. 1, 1964, Ser. No. 400,905
6 Claims. (Cl. 260—580)

This invention relates to an improved process for the preparation of a chemical intermediate which is useful for preparing dyes and pigments. More particularly, this invention relates to an improved process for preparing 3-chloro-4-toluidine from 4-nitrotoluene.

3-chloro-4-toluidine is an old and well-known compound which has previously been shown to be useful for the preparation of 6-amino-4-chloro-m-toluene sulfonic acid by the sulfonation thereof. 6-amino-4-chloro-m-toluene sulfonic acid is also an old and well-known compound which is useful for the preparation of dyes and pigments by coupling the diazotized 6-amino-4-chloro-m-toluene sulfonic acid with other compounds such as β-naphthol or β-oxynaphthoic acid to produce Pigment Red 69 (C.I. 15,595) and Pigment Red 48 (C.I. 15,865) respectively. The coupling reaction and product of diazotized 6-amino-4-chloro-m-toluene sulfonic acid with β-naphthol are taught in Julius et al. U.S. Patent No. 759,716 issued May 10, 1904.

Briefly, the novel process of the present invention comprises chlorinating 4-nitrotoluene until a maximum conversion to 2-chloro-4-nitrotoluene has been achieved with a minimum amount of contamination by unreacted 4-nitrotoluene and reaction by-products; stopping the chlorination reaction when such maximum conversion has been achieved and washing the product substantially free of inorganic materials to leave an organic component containing between 85% and 98% (and preferably between 90% and 95%) of 2-chloro-4-nitrotoluene; reducing the organic component thus produced to convert the 2-chloro-4-nitrotoluene therein to 3-chloro-4-toluidine; and then recovering substantially pure 3-chloro-4-toluidine therefrom.

The key to the successful operation of this process lies in stopping the chlorination reaction after substantially all of the 4-nitrotoluene has been chlorinated but before any substantial amount of dichloronitrotoluene has been formed. This produces a reaction mixture wherein the nitro groups can be converted to amine groups without the necessity of separating the 2-chloro-4-nitrotoluene from the organic contaminants therein while still producing 3-chloro-4-toluidine in a reaction mix from which it can readily be separated.

A preferred way of achieving this result is to monitor the progress of the chlorination reaction using vapor phase chromatography to analyze for the percentage of 2-chloro-4-nitrotoluene in the reaction mix and to slow down the speed of the chlorination reaction as the endpoint is being neared. Also, when the desired conversion has been achieved, as would be indicated by successive analyses of the reaction mix showing substantially the same amount of 2-chloro-4-nitrotoluene therein, the reaction may be stopped by the addition of water or other aqueous solution, which may also be a dilute aqueous caustic solution for washing this reaction mix free of such inorganic materials as chlorine, hydrogen chloride, and the remainder of the catalyst used.

For a clearer and more detailed understanding of the invention, reference may be had to the subjoined description of the steps in the process and the illustrative examples of a preferred embodiment thereof.

In essence, the present invention comprises a process which involves two chemical steps: (a) chlorination of 4-nitrotoluene to produce 2-chloro-4-nitrotoluene and (b) reducing 2-chloro-4-nitrotoluene to produce 3-chloro-4-toluidine.

The chlorination of the 4-nitrotoluene is conducted in the presence of a chlorination catalyst using approximately one mole of elementary chlorine per mole of 4-nitrotoluene. To compensate for manipulative and other losses, up to a 10% or 15% excess of chlorine may be used. A preferred catalyst is ferric chloride, although such other chlorination catalysts as antimony trichloride or aluminum trichloride may be used. The reaction rate is very sensitive to the concentration of catalyst present in the reaction mix, although catalyst concentrations in the range of .001 to .1 mole percent may be used. The chlorination reaction may be conducted at elevated temperatures, such as between 50° C. and 100° C. while adding the chlorine over an extended period of time. A preferred temperature range for the chlorination is about 75° C. to about 80° C. until the chlorination is about 50% to 70% complete, at which time the temperature may be conveniently dropped to about 60° C. to about 70° C. This reduction in temperature coupled with the addition of the chlorine at such a rate that a large excess of elementary chlorine is never present in the reaction mix serves to minimize the formation of dichloronitrotoluene by-products. The reaction is continued until there has been an 85% to 98% conversion of the 4-nitrotoluene to 2-chloro-4-nitrotoluene and preferably, the reaction is stopped when between 90% and 95% conversion has been achieved.

Since the reaction rate is very dependent upon catalyst concentration and temperature, it is essential that the progress of the reaction be monitored. A most convenient control technique for following the reaction is by repeated sampling and analysis by use of vapor phase chromatography. By such technique, analyses can be made for the percent of 4-nitrotoluene, 2-chloro-4-nitrotoluene, and dichloronitrotoluene in the reaction mix.

It has been found that the reaction progresses in a series of stages which overlap only slightly. The first stage is the conversion of 4-nitrotoluene to 2-chloro-4-nitrotoluene which proceeds smoothly and easily until most of the 4-nitrotoluene has been converted. The second stage is a conversion of the 2-chloro-4-nitrotoluene to dichloronitrotoluene and unidentified products which starts to occur while the last of the 4-nitrotoluene is still being converted to 2-chloro-4-nitrotoluene. Repetitive sampling and analyses of the reaction mix enables one to follow the progress of this reaction, particularly at the time when the first stage is ending and the second stage is beginning.

Since the product of this reaction is going to be used without purification in the second stage of the process, it is essential that the reaction be stopped at approximately the time of maximum conversion of the 4-nitrotoluene to 2-chloro-4-nitrotoluene in order to minimize the formation or retention of organic contaminants which would be difficult to separate from the desired end product and which would reduce the efficiency of this process. Thus, the rate of reaction may be slowed down as the percent conversion nears the end-point in order to permit better control and more precise determination of the endpoint of this reaction. The reaction is considered complete when two consecutive samples report the same percentage of 2-chloro-4-nitrotoluene or when a later sample reports a slightly lower percentage of 2-chloro-4-nitrotoluene than the immediately preceding sample. When this endpoint is reached, it is found that little or no unreacted 4-nitrotoluene remains, little or no undesired 3-chloro-4-nitrotoluene is formed, and the formation of dichloronitrotoluene is kept to an absolute minimum therefore producing a maximum conversion to the desired 2-chloro-4-nitrotoluene.

When the desired endpoint has been reached, the reaction is stopped by discontinuing the addition of chlorine and by the addition of water or dilute aqueous caustic solution which serves to wash the product substantially free of inorganic materials, such as unreacted chlorine, hydrogen chloride byproduct, and the catalyst and catalyst degradation products. No purification of the separated crude organic product is made except for the removal of the inorganic contaminants.

This crude organic component, which contains 85% to 98% (and preferably 90% to 95%) of 2 - chloro - 4-nitrotoluene containing traces to small amounts of unreacted 4-nitrotoluene and overreacted dichloronitrotoluene, is then reduced by a conventional reduction process, such as a catalytic reduction or an acid-metal reduction. Preferably, a metal and acid reduction process is used, such as with iron and acetic acid or hydrochloric acid. Preferably, this reduction is carried out at reflux temperature in an aqueous system by slowly adding the crude 2-chloro-4-nitrotoluene to a boiling mixture of iron powder or iron filings and dilute hydrochloric acid and reacting at the reflux until the reaction is complete. Completeness of this reduction reaction can be detected by noting when the condensate in the reflux column loses is yellow color or by repeated sampling of the reduction mix and analyses by such techniques as vapor phase chromatography.

After this reaction is complete, the desired 3-chloro-4-toluidine is separated from the small amounts of byproduct, such as 4-toluidine, isomeric 2-chloro-4-toluidine, dichlorotoluidines and other impurities. Preferably, this purification may be accomplished by making the reduction mixture alkaline by the addition of sufficient basic material (such as sodium carbonate or sodium hydroxide solution) to raise the pH to a level sufficient to change phenolphthalein indicator to a pink color and then steam distilling the crude product from this reduction mixture. Substantially pure 3-chloro-4-toluidine may be obtained from this steam distilled crude product by fractional distillation in the absence of light.

This substantially pure 3-chloro-4-toluidine may be converted into 6-amino-4-chloro-m-toluene sulfonic acid by conventional methods which involve reacting 3-chloro-4-toluidine with sulfuric acid at elevated temperature. One such process is an azeotropic process wherein the amine bisulfate from the reaction of 3-chloro-4-toluidine and sulfuric acid is heated in the presence of a high boiling solvent (such as o-dichlorobenzene) which removes the water formed by codistillation. Another conventional process known as the "bake process" which is carried out in a heated ball mill, preferably in an inert atmosphere such as carbon dioxide. At a temperature of between 175° C. and 250° C., the amine bisulfate is heated and rolled in the ball mill until the reaction is complete, which generally takes about two to twenty-four hours. Alternatively, 3-chloro-4-toluidine may be charged to the ball mill and the amine bisulfate formed therein by the addition of the proper amount of sulfuric acid. After the ball mill is cooled, 6-amino-4-chloro-m-toluene sulfonic acid is discharged from the mill as a powder which may be used for the preparation of pigments without further purification. However, if desired for certain purposes, the 6-amino-4-chloro-m-toluene sulfonic acid may be further purified by reprecipitation from a caustic solution, dried and ground.

In accordance with the teachings of the present invention as described above, a specific embodiment of this invention which is presently preferred, may be found in the subjoined examples.

EXAMPLE 1

*Chlorination of 4-nitrotoluene*

A charge of 1744 grams of 4-nitrotoluene was heated until it was all in the liquid state and then 32 grams of anhydrous ferric chloride was added. Chlorine was then introduced through a sparger while stirring. The temperature was maintained at 75 to 80° C. until the mixture showed a concentration of 55 to 65% 2-chloro-4-nitrotoluene, as determined on a sample analyzed by vapor phase chromatography. The temperature of the mixture was then decreased to 63 to 65° C. and the chlorination was continued, the chlorine being added (intermittently) at five to ten minute periods. The flow of chlorine was continued until analysis of a sample of the reaction mixture (by vapor phase chromatography) showed it to contain about 90% 2-chloro-4-nitrotoluene. At this point, introduction of chlorine was terminated and warm water was added to stop the chlorination.

Sodium hydroxide solution, in an amount sufficient to neutralize the hydrochloric acid and chlorine present was then added. The ferric chloride catalyst was converted to the hydroxide, which became suspended in the aqueous layer; the aqueous layer with the suspended iron hydroxide was removed and the molten crude 2-chloro-4-nitrotoluene was washed with water. The molten material was then allowed to cool forming a solid material which may be crushed to fine powder.

By very careful control of the chlorination to avoid a large excess of chlorine being present at any time to avoid over chlorination, a product may be obtained which is of high quality containing 85 to 98% 2-chloro-4-nitrotoluene with only small amounts of 2,6 - dichloro - 4 - nitrotoluene and with only traces of 3-chloro-4-nitrotoluene isomer, and unreacted 4-nitrotoluene.

A study of the course of the chlorination reaction at a temperature of 65 to 70° C. showed that mainly only 2-chloro-4-nitrotoluene was formed for the first two hours or until the concentration of the mixture reaches about 80% 2-chloro-4-nitrotoluene. At this point, the concentration of 4-nitrotoluene became so low that the presence of the high concentration of 2 - chloro - 4 - nitrotoluene causes the chlorine to react with the formation of 2,6-dichloro-4-nitrotoluene at an accelerated rate. To avoid excessive formation of 2,6-dichloro-4-nitrotoluene, the chlorination is stopped when the maximum amount of 2-chloro-4-nitrotoluene is formed (90 to 95%).

The crude 2-chloro-4-nitrotoluene at this point is not purified further, but is used directly in the reduction step to the amino compound. Distillation of the chloronitro-compound was found to be unnecessary and in addition, distillation of such a material presents serious decomposition and corrosion hazards.

EXAMPLE 2

*Reduction of 2-chloro-4-nitrotoluene to 3-chloro-4-toluidine*

To a suspension of 2220 grams of 60 mesh iron powder in 2220 ml. of water at 70° C. was added 222 ml. of 20° Bé. hydrochloric acid. After heating this to the reflux temperature, crude 2-chloro-4-nitrotoluene, prepared as in Example 1, was added slowly and gradually over a two hour period (as a solid powder or in the molten state). After all the material had been added, the reaction mixture was heated with stirring an additional five hours or until a vapor phase chromatographic analysis on a sample showed the reduction to be complete. After cooling to 80° C., 300 ml. of 24% aqueous sodium hydroxide solution was added. The 3-chloro-4-toluidine was steam distilled from the alkaline reaction mixture. Separation of the organic layer from the aqueous layer gave 1530 grams of crude amine (an 84% yield) (plus an additional 5% recovered by extraction of the aqueous layer).

This crude 3-chloro-4-toluidine was fractionally distilled in the absence of light giving 1053 grams of pure 3-chloro-4-toluidine.

Actually, distillation gave cuts totaling 106 grams of 4-toluidine and combined fractions including the 1053 grams of purified material having the following composition, showing the formation of only insignificant amounts of other materials;

|  | Percent | Grams |
|---|---|---|
| 4-toluidine | 0.075 | 0.86 |
| 3-chloro-4-toluidine | 99.82 | 1,147.9 |
| 2-chloro-4-toluidine | 0.098 | 1.13 |
| 3,5-dichloro-4-toluidine | 0.00 | 0.00 |

The crude amine contained 88.3% of 3-chloro-4-toluidine which was a 75% overall yield based on starting nitrotoluene.

EXAMPLE 3

*Sulfonation process for formation of 6-amino-4-chloro-m-toluene sulfonic acid*

This reaction is carried out in a ball mill using steel balls. 100 grams of 3-chloro-4-toluidine bisulfate (or an equivalent amount of 3-chloro-4-toluidine with sufficient 96% sulfuric acid to form the amine bisulfate) was charged to the mill. The mill was closed and a stream of carbon dioxide gas was passed through the mill during the entire heating and cooling period. The mill was rolled and heated to a temperature of about 200° C. over a period of about two hours (oil bath temperature 204° C., internal temperature of the mill 197° C.). The charge was then heated and rolled for two hours at this temperature and then allowed to cool while rolling. The product is a light grayish-pink solid, 6-amino-4-chloro-m-toluene sulfonic acid of excellent quality (89.8 grams, 97% yield).

EXAMPLE 4

A 42.6 gram portion of crude 3-chloro-4-toluidine (88.3% real) and a 400 ml. portion of o-dichlorobenzene were placed in a flask. The mixture was stirred and heated to 100° C. At this temperature 30 grams of C.P. conc. sulfuric acid was added over six minutes. The temperature was then gradually raised to 175 to 180° C. and the vapors were condensed for distillation. As the solvent distilled, removing the water formed, fresh o-dichlorobenzene was added to keep the volume constant. After two and one half hours, heating was stopped and the mixture was filtered. The filter cake consisting of 6-amino-4-chloro-m-toluene sulfonic acid was washed with carbon tetrachloride and dried at 50° C. This product gave a clear solution in aqueous alkali and produced good pigments.

I claim:

1. A process for the preparation of 3-chloro-4-toluidine comprising:
   (a) chlorinating 4-nitrotoluene with elementary chlorine in the presence of a chlorination catalyst until the reaction has produced conversion of said 4-nitrotoluene to 2-chloro-4-nitrotoluene with a minimum amount of contamination by unreacted 4-nitrotoluene and dichloronitrotoluene;
   (b) stopping the reaction when such conversion has been achieved and washing the product substantially free of inorganic materials to leave an organic component containing 85% to 98% 2-chloro-4-nitrotoluene;
   (c) reducing said organic component to convert the 2-chloro-4-nitrotoluene therein to 3-chloro-4-toluidine; and
   (d) recovering substantially pure 3-chloro-4-toluidine therefrom.

2. A process for the preparation of 3-chloro-4-toluidine comprising:
   (a) chlorinating 4-nitrotoluene with elementary chlorine in the presence of ferric chloride at a temperature between 50° C. and 100° C. until the reaction has produced conversion of said 4-nitrotoluene to 2-chloro-4-nitrotoluene with a minimum amount of contamination by unreacted 4-nitrotoluene and dichloronitrotoluene;
   (b) stopping the reaction when such conversion has been achieved by the addition of aqueous liquid and washing the product substantially free of inorganic materials with a dilute aqueous caustic solution to leave an organic component containing 85% to 98% 2-chloro-4-nitrotoluene;
   (c) reducing said organic component by refluxing it in a boiling mixture of dilute hydrochloric acid and iron particles until the 2-chloro-4-nitrotoluene is converted into 3-chloro-4-toluidine;
   (d) adding sufficient basic material to make the reaction mixture alkaline and steam distilling it to isolate a crude product containing 3-chloro-4-toluidine; and
   (e) fractional distilling said crude product in the absence of light to separate substantially pure 3-chloro-4-toluidine.

3. A process for the preparation of 3-chloro-4-toluidine comprising:
   (a) chlorinating 4-nitrotoluene with elementary chlorine in the presence of ferric chloride at a temperature between 50° C. and 100° C. until the reaction has produced conversion of said 4-nitrotoluene to 2-chloro-4-nitrotoluene with a minimum amount of contamination by unreacted 4-nitrotoluene and dichloronitrotoluene;
   (b) stopping the reaction when such conversion has been achieved by the addition of aqueous liquid and washing the product substantially free of inorganic materials with a dilute aqueous caustic solution to leave an organic component containing 85% to 98% 2-chloro-4-nitrotoluene;
   (c) reducing said organic component to convert the 2-chloro-4-nitrotoluene therein to 3-chloro-4-toluidine; and
   (d) recovering substantially pure 3-chloro-4-toluidine therefrom.

4. A process for the preparation of 3-chloro-4-toluidine comprising:
   (a) chlorinating 4-nitrotoluene with elementary chlorine in the presence of ferric chloride at a temperature of about 75° C. to about 80° C. until the chlorination is about 50% to about 70% complete and then at a temperature of about 60° C. to about 70° C. until the reaction has produced conversion of said 4-nitrotoluene to 2-chloro-4-nitrotoluene with a minimum amount of contamination by unreacted 4-nitrotoluene and dichloronitrotoluene;
   (b) stopping the reaction when such conversion has been achieved by the addition of aqueous liquid and washing the product substantially free of inorganic materials with a dilute aqueous caustic solution to leave an organic component containing 85% to 98% 2-chloro-4-nitrotoluene;
   (c) reducing said organic component by refluxing it in a boiling mixture of dilute hydrochloric acid and iron particles until the 2-chloro-4-nitrotoluene is converted into 3-chloro-4-toluidine;

(d) adding sufficient basic material to make the reaction mixture alkaline and steam distilling it to isolate a crude product containing 3-chloro-4-toluidine; and (e) fractional distilling said crude product in the absence of light to separate substantially pure 3-chloro-4-toluidine.

5. A process as defined in claim 4 wherein said ferric chloride is present in the chlorination reaction mixture at a concentration of 0.001 to 0.1 mole percent.

6. A process as defined in claim 4 wherein the elementary chlorine is added to the 4-nitrotoluene in the presence of ferric chloride over an extended period of time and at a rate such that a large excess of elementary chloride is never present in the reaction mix.

No references cited.

CHARLES B. PARKER, *Primary Examiner.*

NELSON A. WICZER, *Assistant Examiner.*